United States Patent
Ridyard

[11] 3,993,440
[45] Nov. 23, 1976

[54] COLORATION WITH AZO CARBOXY PYRAZOLONE

[75] Inventor: Denis Robert Annesley Ridyard, Manchester, England

[73] Assignee: Imperial Chemical Industries Limited, London, England

[22] Filed: Jan. 28, 1974

[21] Appl. No.: 437,390

[30] Foreign Application Priority Data
Jan. 30, 1972    United Kingdom............... 4582/72

[52] U.S. Cl. .................................. 8/41 B; 8/1 D;
8/1 E; 260/153; 260/154
[51] Int. Cl.[2] ................ D06P 1/39; D06P 1/382; D06P 1/18
[58] Field of Search............... 260/153, 154; 8/41 B

[56] References Cited
UNITED STATES PATENTS

| | | | |
|---|---|---|---|
| 2,892,671 | 6/1959 | Alsberg.................................. | 8/41 |
| 3,709,869 | 1/1973 | Mazza................................... | 260/153 |
| 3,758,470 | 9/1973 | Ackermann.......................... | 260/249 |

Primary Examiner—Christopher A. Henderson, Jr.
Attorney, Agent, or Firm—Cushman, Darby & Cushman

[57] ABSTRACT

A process for the coloration of polyamide textile materials which comprises treating a polyamide textile material with an aqueous solution of an azo dye of the formula:

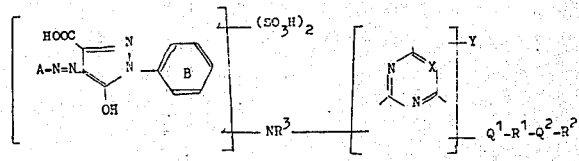

wherein A represents the residue of a diazo component of the benzene or naphthalene series; X represent =N—,

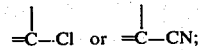

Y represents chlorine or bromine; $Q^1$ represents —O— or —S—; $Q^2$ represents a direct link, —O—, —CO—, —SO$_2$—, —SO$_2$NH—, —NHSO$_2$—, —CONH—, —NHCO—, —COO—, —OCO—, —SO$_2$—, —S— or —NR$^4$— in which R$^4$ represents hydrogen or lower alkyl; R$^1$ represents an alkylene, cycloalkylene or arylene radical; R$^2$ represents an optionally substituted alkyl, cycloalkyl, aralkyl or aryl radical such that R$^1$ and R$^2$ together contain not more than 13 carbon atoms; R$^3$ represents hydrogen or lower alkyl and ring B may carry one or more substituents.

1 Claim, No Drawings

COLORATION WITH AZO CARBOXY PYRAZOLONE

This invention relates to a coloration process and more particularly to a process for the coloration of polyamide textile materials.

According to the invention, there is provided a process for the coloration of polyamide textile materials which comprises treating a polyamide textile material with an aqueous solution of an azo dye of the formula:

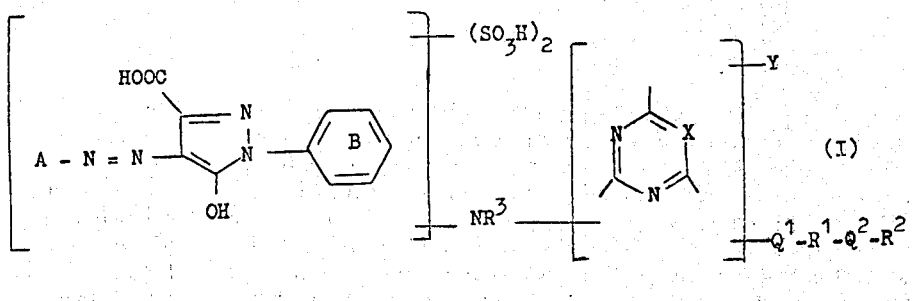
(I)

wherein A represents the residue of a diazo component of the benzene or naphthalene series; X represents =N—,

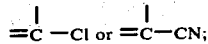

Y represents chlorine or bromine; $Q^1$ represents —O— or —S—; $Q^2$ represents a direct link, —O—, —CO—, —SO$_2$—, —SO$_2$NH—, —NHSO$_2$—, —CONH—, —NHCO—, —COO—, —OCO—, —OSO$_2$—, —S— or —NR$^4$— in which R$^4$ represents hydrogen or lower alkyl; R$^1$ represents an alkylene, cycloalkylene or arylene radical; R$^2$ represents an optionally substituted alkyl, cycloalkyl, aralkyl or aryl radical such that R$^1$ and R$^2$ together contain not more than 13 carbon atoms; R$^3$ represents hydrogen or lower alkyl and ring B may carry one or more substituents.

The radical represented by A may carry the usual substituents appropriate to diazo components. Examples of such substituents include sulphonic acid and carboxylic acid groups, chlorine, bromine, cyano, hydroxy, alkyl, alkoxy, trifluoromethyl, —NHCOR$^5$ where R$^5$ is an alkyl, aryl, alkoxy, aryloxy, alkylamino, arylamino or amino radical, —SO$_2$NR$^6$R$^7$ where R$^6$ is alkyl or aryl and R$^7$ is hydrogen or alkyl and —SO$_2$R$^8$ where R$^8$ is alkyl or aryl. Other substituents which may be carried by A include phenyl-azo and naphthylazo radicals which may themselves be substituted.

The two sulphonic acid groups may both be present in radical A or both may be attached to ring B or one may be in A and the other attached to B. In addition to carrying one or two sulphonic acid groups, ring B may carry one or more other substituents, for example chlorine or bromine atoms and hydroxy, alkyl, alkoxy or —NHCOR$^5$ groups where R$^5$ has the meaning stated above.

Throughout the specification the term "lower alkyl" is used to denote alkyl radicals containing from 1 to 4 carbon atoms.

Preferably, R$^1$ is an arylene radical and R$^2$ is an alkyl radical containing 4 to 7 carbon atoms. In these cases, $Q^1$ is preferably oxygen and $Q^2$ is preferably a direct link.

The dyes of Formula I may be prepared by reacting a compound of the formula:

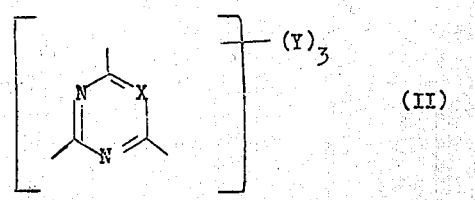
(II)

wherein X and Y have the meanings already stated, with, in either order, equimolecular proportions of an azo compound of the formula:

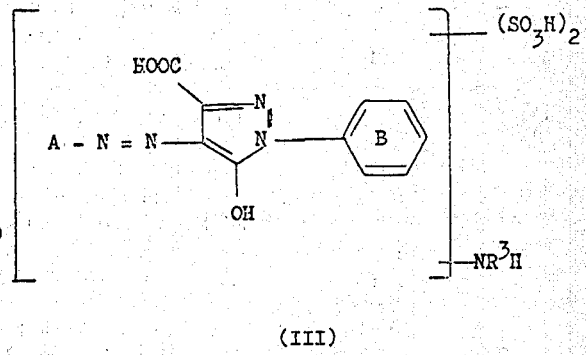
(III)

wherein A, B and R$^3$ have the meanings already stated and a compound of the formula:

$$R^2 - Q^2 - R^1 - Q^1 - H \qquad (IV)$$

wherein R$^1$, R$^2$, $Q^1$ and $Q^2$ have the meanings already stated.

The dyes of Formula I may also be prepared by diazotizing an aromatic amine and coupling the diazo compound so obtained with a coupling component of the 1-phenyl-3-carboxy-5-pyrazolone series, the amine and the coupling component together containing 2 sulphonic acid groups and a group of the formula:

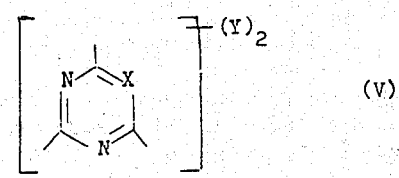
(V)

wherein X and Y have the meanings already stated, to form a dye of the formula:

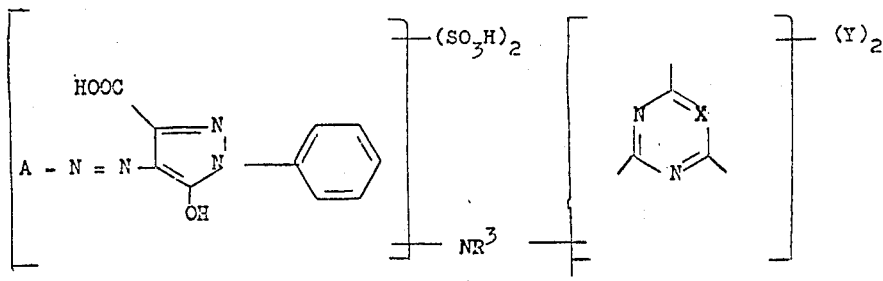

which is then reacted with a compound of Formula IV except where $R^1$ is an alkylene or cycloalkylene radical.

Suitable compounds of Formula II are cyanuric chloride, cyanuric bromide, 2,4,6-trichloropyrimidine, 2,4,6-tribromopyrimidine, 2,4,5,6-tetrachloropyrimidine and 2, 4, 6-trichloro-5-cyanopyrimidine.

Azo compounds of Formula III have been fully described in the prior art and may be prepared from diazotizable aromatic amines and suitable coupling components in the usual way, for example by diazotizing an aromatic amine which may also contain an acetylamino group and coupling under alkaline conditions onto a 1-(aminophenyl or acetylaminophenyl)-3-carboxy-5-pyrazolone followed by hydrolysis of the acetylamino group if required.

Examples of aromatic amines which may be used in the preparation of azo compounds of Formula III include 3-aminoacetanilide, 4-aminoacetanilide, aniline-2-, -3- or -4-sulphonic acid, aniline-2,5-, -2,4- or -3,4-disulphonic acid, 2-aminophenol-4- or -6-sulphonic acid, 4- or 5-sulpho-2-aminobenzoic acid, 4-(or 6-)chloro-2-aminophenol-6-(or 4-)sulphonic acid, 2-aminophenol-4,6-disulphonic acid, 4-(acetylamino or methyl or methoxy)aniline-2-sulphonic acid, 1-naphthylamine-3-, -4-, -5-, -6-, -7- or -8-sulphonic acid, 2-aminonaphthalene-1-, -5-, -6-, -7- or -8-sulphonic acid, 1-naphthylamine-2,7-, -3,6-, -3,8-, -4,6- or -4,7-disulphonic acid, 2-naphthylamine-1,5-, -3,7-, -4,8-, -5,7- or -6,8-disulphonic acid, 5-acetylaminoaniline-2-sulphonic acid, 2,5-dichloroaniline-4-sulphonic acid and aniline-5-sulphonanilide-2-sulphonic acid.

As examples of coupling components which may be used in the preparation of azo compounds of Formula III there may be mentioned 1-phenyl-3-carboxy-5-pyrazolone, 1-(2'-, 3'- or 4'-sulphophenyl)-3-carboxy-5-pyrazolone, 1-(2'-chloro-5'-sulphophenyl)-3-carboxy-5-pyrazolone, 1-(2',4'- or 2',5'-disulphophenyl)-3-carboxy-5-pyrazolone, 1-(3'- or 4'-acetylaminophenyl)-3-carboxy-5-pyrazolone, 1-(2',5'-dichloro-4'-sulphophenyl)-3-carboxy-5-pyrazolone, 1-(4'-aminophenyl)-3-carboxy-5-pyrazolone, 1-(4'-amino-3'-sulphophenyl)-3-carboxy-5-pyrazolone, 1-(3'-aminophenyl)-3-carboxy-5-pyrazolone and 1-(3'-amino-4'-sulphophenyl)-3-carboxy-5-pyrazolone.

Suitable compounds of Formula IV include the alkylphenols, for example o, m and p-butylphenols, amylphenols and hexylphenols; cycloalkylphenols, for example o- and p-cyclohexylphenols; aralkylphenols, for example o-, m- and p-benzylphenols; arylphenols, for example o-, m- and p-phenylphenols; alkoxyphenols, for example hydroquinone and resorcinol monoalkyl ethers where the alkyl residue may be ethyl, propyl, butyl, amyl, hexyl and heptyl; cycloalkoxyphenol, for example p-cyclohexyloxyphenol, aralkoxyphenols, for example p-benzyloxyphenol; aryloxyphenols, for example p-phenoxyphenol; thio-substituted phenols, for example o-, m- and p-(butylthio)phenols, o- and m-(hexylthio)phenols, o-(heptylthio)phenol, o- and p-(benzylthio)phenols, o-, m- and p-(phenylthio)phenols; benzenethiols, for example p-butylbenzenethiol, p-butoxybenzenethiol, p-(butylthio) benzenethiol, p-amylbenzenethiol, p-hexylbenzenethiol, p-hexyloxy benzenethiol, p-biphenylenethiol, and m-(phenylthio) benzenethiol; aliphatic alcohols and thiols, for example nonanol, dodecanol, 3,3,5-trimethyl cyclohexanol, p-butylcyclohexanol, 2-octyloxyethanol, p-butoxycyclohexanol, p-ethylthiocyclohexanol, 2-benzylcyclohexanol, 3-phenyl-1-methylpropyanol, 2-phenoxyethanol, 2-phenylthioethanol, nonanethiol and 2-phenoxyethanethiol.

Aromatic amines which contain a fibre reactive group of Formula V can be obtained by condensing a compound of Formula II with the appropriate diamine under such conditions that only one of the two amino groups reacts with the compound of Formula II. As specific examples of such diamines there may be mentioned 1,3-phenylene-diamine-4-sulphonic acid, 1,4-phenylene diamine-2-sulphonic acid, 1.3-phenylene diamine-4,6-disulphonic acid, 1,4-phenylene diamine-2,5-disulphonic acid and 2,6-diaminonaphthalene-4,8-disulphonic acid.

The reactions leading to the formation of dyes of Formula I may be carried out using conditions that have been fully described in the prior art for such reactions.

Polyamide textile materials which may be coloured with dyes of Formula I using conventional dyeing, padding or printing techniques include natural and synthetic polyamide textiles, for example wool, silk and nylon. The polyamides may be in any textile form, for example filaments, staple, yarn or woven or knitted fabrics.

The dyes of Formula I are especially suitable for dyeing wool, including wool which has been rendered non-felting or machine-washable by chemical processes such as acid chlorination, the use of hypochlorite under neutral or slightly alkaline conditions, the use of permonosulphuric acid, the use of the sodium salt of dichloroisocyanuric acid, and by the deposition of polymers on the surface of the wool using for example amine-epichlorohydrin resins. Material which has been so treated may be dyed by conventional wool dyeing methods, by the use of pad-batch dyeing methods, and also by continuous pad-steam processes. When applied to such fibres, the dyes have excellent fastness to wet treatments and to light.

The invention is illustrated but not limited by the following Examples in which all parts and percentages are by weight.

EXAMPLE 1

A solution of 4.7 parts of 1,3-phenylenediamine-4-sulphonic acid in 100 parts of water at pH 7.0 is added during 20 minutes at 0°–5° C to a suspension prepared by dissolving 4.62 parts of cyanuric chloride in 15 parts of acetone and adding the resulting solution to 30 parts of water and 30 parts of ice. The mixture is stirred for 2 hours at 0°–5° C maintaining the pH at 4–5 by addition of 10% sodium carbonate solution as required. 7.5 Parts of 36% hydrochloric acid are then added and the mixture diazotized by the addition of 1.7 parts of sodium nitrite in 11.5 parts of water. The diazo suspension is then added to a solution of 7.1 parts of 1-(4'-sulphophenyl)-3-carboxy-5-pyrazolone in 100 parts of water at 0°–5° C and pH 9.0 and the mixture is stirred at 0°–5° C for 2 hours maintaining the pH at 9.0 by addition of 10% sodium carbonate solution. A solution of 4.2 parts of p-tert-butylphenol in 50 parts of acetone is then added to the dichlorotriazinylazo dyestuff suspension and the temperature is raised to 30° C. The reaction mixture is stirred at 30° C for 3 hours maintaining the pH at 9.0 by the addition of 10% sodium carbonate as required; the pH is then adjusted to between 6.5 and 7.0. Sodium chloride (10% aqueous solution) is then added and the precipitated dyestuff is filtered off, washed with 10% sodium chloride solution and dried at 40° C.

When applied to wool which has been rendered machine washable (e.g., Hercosett wool) from a weakly acid dyebath, the dyestuff yields a bright greenish yellow shade having excellent fastness to wet treatments and to light.

EXAMPLE 2

When the 4.7 parts of 1,3-phenylenediamime-4-sulphonic acid in Example 1 are replaced by 4.7 parts of 1,4-phenylenediamine-2-sulphonic acid, a dyestuff is obtained which yields a bright orange shade on wool having excellent fastness to wet treatments and to light.

The following Table gives further examples of dyes useful in the invention obtained in a similar manner to Examples 1 and 2 by condensing the diamine named in the second column with one mole of the acid chloride compound named in the first column and diazotizing and coupling the resultant amino compound with the coupling component named in the third column followed by condensation with the phenol or thiol named in the fourth column. The shade of the dyestuff when applied to wool or nylon is given in the final column.

Alternatively the diamine named in the second column is condensed with the alkoxy or alkylthio dichlorotriazinyl compound in the first column and the resultant amino compound is diazotized and coupled with the coupling component named in the third column.

| Example | I | II | III | IV | V |
|---|---|---|---|---|---|
| 3 | cyanuric chloride | 1,3-phenylene diamine-4-sulphonic acid | 1-(4'-sulphophenyl)-3-carboxy-5-pyrazolone | 4-t-amylphenol | Greenish-yellow |
| 4 | " | " | " | 4-hexylphenol | " |
| 5 | " | " | 1-(3'-sulphophenyl)-3-carboxy-5-pyrazolone | 4-t-butylphenol | " |
| 6 | " | " | 1-(2'-chloro-5'-sulphophenyl)-3-carboxy-5-pyrazolone | " | " |
| 7 | " | " | 1-(2',5'-dichloro-4'-sulphophenyl)-3-carboxy-5-pyrazolone | " | " |
| 8 | " | 1,4-phenylene diamine-2-sulphonic acid | " | " | Reddish-yellow |
| 9 | " | " | 1-(4'-sulphophenyl)-3-carboxy-5-pyrazolone | 4-t-amylphenol | " |
| 10 | " | " | " | 4-cyclohexyl-phenol | " |
| 11 | 2,4,6-trichloro-pyrimidine | " | " | 4-t-butylphenol | " |
| 12 | 2,4,5,6-tetra chloropyrimidine | " | 1(2'-chloro-5'-sulphophenyl)-3-carboxy-5-pyrazolone | " | " |
| 13 | 2,4,6-trichloro-5-cyanopyrimidine | " | " | 4-hexylphenol | " |
| 14 | cyanuric chloride | 1,3-phenylene diamine-4,6-disulphonic acid | 1-phenyl-3-carboxy-5-pyrazolone | 4-hexylphenol | Greenish-yellow |
| 15 | " | " | 1-(2'-chlorophenyl)-3-carboxy-5-pyrazolone | 4-t-butylphenol | " |
| 16 | " | " | 1-(4'-chlorophenyl)-3-carboxy-5-pyrazolone | " | " |
| 17 | " | 1,4-phenylene diamine 2,5-disulphonic acid | 1-phenyl-3-carboxy-5-pyrazolone | 4-t-amylphenol | Reddish-yellow |
| 18 | " | " | 1-(2'-chlorophenyl)-3-carboxy-5-pyrazolone | 4-t-butylphenol | " |
| 19 | " | " | 1-phenyl-3-carboxy-5-pyrazolone | 4-butylbenzene thiol | " |
| 20 | " | " | " | 4-phenylphenol | " |
| 21 | " | " | " | 4-phenoxyphenol | " |
| 22 | " | 2,6-diaminonaphthalene-4,8-disulphonic acid | " | 4-t-butylphenol | orange |
| 23 | " | " | " | 4-cresol | " |
| 24 | 2-benzyloxy-4,6-dichloro-s-triazine | 1,3-phenylene diamine-4-sulphonic acid | 1-(4'-sulphophenyl)-3-carboxy-5-pyrazolone | — | Greenish-yellow |
| 25 | 2-nonyloxy-4,6-dichloro-s-triazine | " | " | — | " |
| 26 | 2-nonylthio-4,6-dichloro-s-triazine | " | " | — | " |

-continued

| Example | I | II | III | IV | V |
|---|---|---|---|---|---|
| 27 | 2-benzyloxy-4,6-dichloro-s-triazine | 1,4-phenylenediamine-2-sulphonic acid | 1-(4'-sulphophenyl)-3-carboxy-5-pyrazolone | — | Reddish-yellow |
| 28 | " | 1,4-phenylene diamine-2,5-disulphonic acid | 1-phenyl-3-carboxy-5-pyrazolone | — | " |
| 29 | " | 1,3-phenylene diamine-4,6-disulphonic acid | " | — | Greenish-yellow |
| 30 | " | " | 1-(2'-chlorophenyl)-3-carboxy-5-pyrazolone | — | " |

The following Table gives further examples of dyes useful in the invention which are prepared by diazotizing the amine in the first column and coupling on to the coupling component named in the second column, hydrolyzing the acetylamino group where appropriate, condensing first with cyanuric chloride and finally with the phenol or thiol listed in the third column. The shade obtained when the dye is applied to wool or nylon is given in the fourth column.

| Example | I | II | III | IV |
|---|---|---|---|---|
| 31 | aniline-2,5-disulphonic acid | 1-(4'-aminophenyl)-3-carboxy-5-pyrazolone | 4-t-butylphenol | greenish-yellow |
| 32 | aniline-2,4-disulphonic | " | 4-hexylphenol | " |
| 33 | aniline-2-sulphonic acid | 1-(4'-amino-3'-sulphophenyl)-3-carboxy-5-pyrazolone | 4-t-butylphenol | " |
| 34 | aniline-3-sulphonic acid | 1-(3'-amino-4'-sulphophenyl)-3-carboxy-5-pyrazolone | 4-t-amylphenol | " |
| 35 | 2,5-dichloroaniline-4-sulphonic acid | " | 4-cresol | " |
| 36 | 4-chloroaniline-2-sulphonic acid | " | 4-t-butylphenol | " |
| 37 | 5-chloroaniline-2-sulphonic acid | " | " | " |
| 38 | 4-methylaniline-2-sulphonic acid | 1-(4'-amino-3'-sulphophenyl)-3-carboxy-5-pyrazolone | " | Yellow |
| 39 | 2-naphthylamine-1-sulphonic acid | " | " | Yellow |
| 40 | 4-methoxyaniline-2-sulphonic acid | " | 4-hexylphenol | Reddish-yellow |
| 41 | 2-naphthylamine-1,5-disulphonic acid | 1-(4'-aminophenyl)-3-carboxy-5-pyrazolone | 4-t-butylphenol | Yellow |
| 42 | 3-aminoacetanilide | 1-(2',4'-disulphophenyl)-3-carboxy-5-pyrazolone | 4-t-butylphenol | greenish-yellow |
| 43 | 4-aminoacetanilide | " | " | reddish-yellow |
| 44 | aniline-2,5-disulphonic acid | 1-(4'-aminophenyl)-3-carboxy-5-pyrazolone | 4-butylbenzenethiol | greenish-yellow |

I claim:
1. A process for the coloration of polyamide textile materials which comprises treating a polyamide textile material with an aqueous solution of an azo dye of the formula

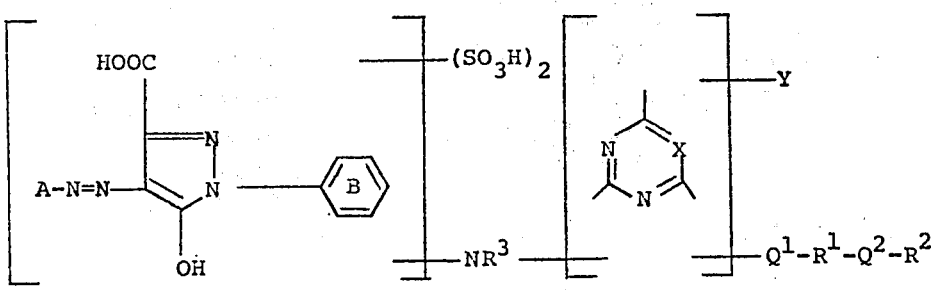

wherein A represents the residue of a diazo component of the benzene or naphthalene series; X represents =N—,
=C—Cl or =C—CN;

Y represents chlorine or bromine; $Q^1$ represents —O—; $Q^2$ represents a direct link; $R^1$ represents a phenylene radical; $R^2$ represents an alkyl radical containing 4 to 7 carbon atoms; $R^3$ represents hydrogen or lower alkyl and ring B may carry one or more substituents selected from the group consisting of sulpho, chlorine, bromine, hydroxy, alkyl, alkoxy and —NHCOR$^5$ wherein R$^5$ is alkyl, aryl, alkoxy, aryloxy, alkylamino, arylamino or amino, any said sulpho substituent being inclusive of those set forth in the structural formula given above.

* * * * *